(12) United States Patent
Bruno

(10) Patent No.: US 10,047,903 B2
(45) Date of Patent: Aug. 14, 2018

(54) FASTENER TOOLS AND TECHNIQUES

(71) Applicant: Dillon Bruno, Inglewood, CA (US)

(72) Inventor: Dillon Bruno, Inglewood, CA (US)

( * ) Notice: Subject to any disclaimer, the term of this patent is extended or adjusted under 35 U.S.C. 154(b) by 220 days.

(21) Appl. No.: 15/146,118

(22) Filed: May 4, 2016

(65) Prior Publication Data
US 2016/0325421 A1     Nov. 10, 2016

Related U.S. Application Data

(60) Provisional application No. 62/156,761, filed on May 4, 2015.

(51) Int. Cl.
| A47G 1/24 | (2006.01) |
|---|---|
| F16M 13/02 | (2006.01) |
| A47G 1/16 | (2006.01) |
| A47G 1/20 | (2006.01) |
| B25H 7/02 | (2006.01) |
| B25C 3/00 | (2006.01) |

(52) U.S. Cl.
CPC ............. *F16M 13/02* (2013.01); *A47G 1/164* (2013.01); *A47G 1/205* (2013.01); *B25C 3/008* (2013.01); *B25H 7/02* (2013.01)

(58) Field of Classification Search
CPC .................................................... A47G 1/205
USPC ........................................................ 33/613
See application file for complete search history.

(56) References Cited

U.S. PATENT DOCUMENTS

| 983,798 A | 2/1911 | Angell |
|---|---|---|
| 1,109,507 A | 9/1914 | Bostock et al. |
| 1,460,294 A | 6/1923 | Wegner et al. |
| 1,575,582 A | 3/1926 | Joy et al. |
| 1,776,646 A | 9/1930 | Wilson et al. |
| 2,349,339 A | 5/1944 | Cloer et al. |
| 2,420,869 A | 5/1947 | Dell et al. |

(Continued)

FOREIGN PATENT DOCUMENTS

| EP | 0196545 | 10/1986 |
|---|---|---|
| GB | 189729395 | 10/1898 |

(Continued)

OTHER PUBLICATIONS

International Search Report and Written Opinion in the parent application's corresponding PCT application No. PCT/US2015/024211.

(Continued)

*Primary Examiner* — Christopher Fulton
(74) *Attorney, Agent, or Firm* — Joseph G. Swan, P.C.

(57) ABSTRACT

Provided is, among other things, an apparatus for facilitating the hanging of an object on a wall or other surface. This apparatus includes: a main body section having a first surface; an upper section connected to the main body section and having a protruding portion that protrudes away from the first surface; a lower section connected to the main body section and having an opening for accepting and holding a hanging/attachment element; and a securing mechanism. At least one of the upper section or the lower section is a slidable section that is slidably attached to the main body section and thereby capable of moving vertically up and down the main body section, but can be temporarily fixed at an arbitrary position along the main body section using the securing mechanism.

25 Claims, 9 Drawing Sheets

(56) References Cited

U.S. PATENT DOCUMENTS

| | | | |
|---|---|---|---|
| 2,652,082 A | 9/1953 | Zanelli et al. | |
| 2,657,382 A | 11/1953 | Lueneburg et al. | |
| 3,060,440 A | 10/1962 | Pfaff et al. | |
| 3,147,484 A | 9/1964 | Nelson et al. | |
| 3,360,229 A | 12/1967 | Beyer et al. | |
| 3,516,165 A | 6/1970 | Pfeffer et al. | |
| 3,530,591 A | 9/1970 | Moffitt et al. | |
| 3,695,499 A | 10/1972 | Taylor et al. | |
| 3,919,903 A | 11/1975 | McAlister | |
| 4,029,135 A | 6/1977 | Searfoss, Jr. | |
| 4,054,237 A | 10/1977 | Rietveld | |
| 4,179,058 A | 12/1979 | Yost | |
| 4,201,258 A | 5/1980 | Elmore et al. | |
| 4,220,309 A | 9/1980 | Eisen et al. | |
| 4,221,248 A | 9/1980 | Rix | |
| 4,241,510 A | 12/1980 | Radecki | |
| 4,336,884 A * | 6/1982 | Hart | A47G 1/205 |
| | | | 206/575 |
| 4,382,337 A | 5/1983 | Bendick | |
| 4,403,725 A | 9/1983 | Lawrence | |
| 4,437,602 A | 3/1984 | Kaczmarek | |
| 4,455,756 A * | 6/1984 | Greene | A47G 1/205 |
| | | | 248/547 |
| 4,473,957 A | 10/1984 | Faulkner | |
| 4,559,690 A | 12/1985 | Asmus | |
| 4,597,554 A | 7/1986 | James | |
| 4,631,985 A | 12/1986 | Roberts | |
| 4,637,583 A | 1/1987 | Babitz | |
| 4,676,424 A | 6/1987 | Meador et al. | |
| 4,843,923 A | 7/1989 | Voss | |
| 4,893,776 A | 1/1990 | Floyd | |
| 4,926,718 A | 5/1990 | Cook | |
| 5,103,574 A | 4/1992 | Levy | |
| 5,109,611 A | 5/1992 | Houck | |
| 5,129,154 A | 7/1992 | Aydelott | |
| 5,375,488 A | 12/1994 | Baitner | |
| 5,454,542 A | 10/1995 | Hart | |
| 5,471,760 A | 12/1995 | Farris | |
| 5,509,213 A | 4/1996 | Kelly et al. | |
| 5,529,234 A | 6/1996 | Juneau | |
| 5,605,313 A | 2/1997 | Erickson et al. | |
| 5,927,675 A * | 7/1999 | Kratish | G01C 9/28 |
| | | | 248/466 |
| 6,026,584 A * | 2/2000 | Wegman | A47G 1/205 |
| | | | 33/451 |
| 6,032,378 A | 3/2000 | Null | |
| 6,088,862 A | 7/2000 | Bulcock | |
| 6,122,788 A | 9/2000 | Bulcock | |
| 6,185,831 B1 | 2/2001 | Pluciennik | |
| 6,352,009 B1 | 3/2002 | Gaidjiergis | |
| 6,421,928 B1 | 7/2002 | Miller | |
| 6,739,065 B2 | 5/2004 | Hofmeister et al. | |
| 6,951,153 B2 | 10/2005 | Berthlaume | |
| 6,952,887 B2 | 10/2005 | Muchnik | |
| 6,957,797 B1 | 10/2005 | Strobel | |
| 6,971,184 B2 | 12/2005 | Prevost | |
| 6,978,551 B2 * | 12/2005 | Krake | A47G 1/205 |
| | | | 33/613 |
| 7,013,516 B1 | 3/2006 | Peters | |
| 7,028,413 B2 | 4/2006 | Filipescu | |
| 7,056,322 B2 | 6/2006 | Davison et al. | |
| 7,100,475 B1 | 9/2006 | Rufolo, Jr. | |
| 7,159,329 B2 | 1/2007 | Dolenz et al. | |
| 7,316,078 B2 | 1/2008 | Hagman | |
| 7,566,042 B1 | 7/2009 | Yates | |
| 7,628,304 B2 | 12/2009 | Yamamoto et al. | |
| 7,665,705 B2 | 2/2010 | Wong | |
| 7,779,730 B2 | 8/2010 | Jones | |
| 7,797,853 B2 | 9/2010 | Compton | |
| 7,802,769 B1 | 9/2010 | Lindsey | |
| 7,814,675 B2 | 10/2010 | Venderley et al. | |
| 7,832,702 B2 | 11/2010 | Yates | |
| 7,963,193 B2 | 6/2011 | Morgan | |
| 8,479,612 B2 | 7/2013 | Sergyeyenko et al. | |
| 8,539,691 B2 | 9/2013 | Daniel | |
| 8,739,423 B1 * | 6/2014 | Cortum | G01C 9/28 |
| | | | 33/374 |
| 8,864,095 B1 * | 10/2014 | Marks | A47G 1/16 |
| | | | 248/323 |
| 9,032,637 B2 * | 5/2015 | Propp | B25H 7/04 |
| | | | 33/613 |
| 2002/0078583 A1 | 6/2002 | Richardson | |
| 2002/0170189 A1 | 11/2002 | Cheatham | |
| 2002/0189119 A1 | 12/2002 | High | |
| 2003/0029986 A1 * | 2/2003 | Zuller | A47G 1/164 |
| | | | 248/476 |
| 2003/0229999 A1 | 12/2003 | Rimback | |
| 2004/0035255 A1 | 2/2004 | Rion | |
| 2004/0177527 A1 * | 9/2004 | Prevost | A47G 1/205 |
| | | | 33/613 |
| 2005/0034318 A1 | 2/2005 | Filipescu | |
| 2005/0166713 A1 | 8/2005 | Lloyd | |
| 2006/0101948 A1 | 5/2006 | Meitzler et al. | |
| 2006/0162174 A1 * | 7/2006 | Vick | B25H 7/04 |
| | | | 33/42 |
| 2006/0196069 A1 | 9/2006 | Groepper | |
| 2006/0231721 A1 | 10/2006 | Robic | |
| 2006/0278804 A1 * | 12/2006 | Hagman | A47G 1/205 |
| | | | 248/544 |
| 2007/0023605 A1 * | 2/2007 | Schlais | A47G 1/205 |
| | | | 248/489 |
| 2009/0261227 A1 | 10/2009 | Venderley et al. | |
| 2009/0283650 A1 | 11/2009 | Yates | |
| 2009/0313843 A1 | 12/2009 | Compton | |
| 2010/0132514 A1 | 6/2010 | Morgan | |
| 2010/0154598 A1 | 6/2010 | Sergyeyenko et al. | |
| 2011/0174116 A1 | 7/2011 | Lin | |
| 2015/0144756 A1 | 5/2015 | Miller | |
| 2016/0128497 A1 | 5/2016 | Marks | |

FOREIGN PATENT DOCUMENTS

| | | |
|---|---|---|
| GB | 805925 | 12/1958 |
| WO | WO1980000785 | 5/1980 |
| WO | WO2000074900 | 12/2000 |
| WO | WO2003094673 | 11/2003 |
| WO | WO2005105385 | 11/2005 |
| WO | WO2004099708 | 11/2014 |

OTHER PUBLICATIONS

Printout of webpage at http://toolmonger.com/2009/12/10/the-nail-holder-is-this-a-good-tool/ on Aug. 12, 2014.
Printout of webpage at http://toolmonger.com/2009/06/02/olympia-tools-nail-holding-hammer/ on Aug. 12, 2014.
Printout of webpage at http://www.starcrest.com/product/garden+and+tools/tools/nailguide.do on Aug. 12, 2014.
Prosecution history of parent U.S. Appl. No. 14/678,162.
Printout of webpage at http://www.amazon.com/Under-Roof-Decorating-5-100117-Picture/dp/B003Z9JN3I on Apr. 12, 2016.
Photographs of Hang & Level product for sale as of at least approximately Nov. 2015.

* cited by examiner

FASTENER TOOLS AND TECHNIQUES

This application claims the benefit of U.S. Provisional Patent Application Ser. No. 62/156,761 (the '761 application), filed on May 4, 2015, and is a continuation in part of U.S. patent application Ser. No. 14/678,162 (filed on Apr. 3, 2015, now U.S. Pat. No. 9,873,190), which claims the benefit of U.S. Provisional Patent Application Ser. No. 62/058,354 (filed on Oct. 1, 2014) and 61/975,459 (filed on Apr. 4, 2014). All the foregoing applications are incorporated by reference herein as though set forth herein in full.

FIELD OF THE INVENTION

The present invention concerns, among other things, tools and/or other apparatuses and devices that can be used in relation to the insertion of a fastener, such as a nail or screw, into a wall or other surface, e.g., for the purpose of hanging a picture or other item on the wall, as well as related techniques for using such tools and/or other apparatuses and devices.

BACKGROUND

Certain conventional tools have been provided for helping people to hang a picture on a wall. However, the present inventor has discovered that such existing tools typically have significant drawbacks. One example of a conventional tool is the Hang & Level™ sold by Under the Roof Decorating™. The present inventor has discovered that this particular product can be awkward and difficult to use, particularly for hanging large and/or heavy pictures or other items and/or when using picture-hanging hooks or other mounting hardware beyond just a simple nail.

SUMMARY OF THE INVENTION

The present invention addresses the foregoing problems by providing, among other things, improved tools for facilitating the hanging of pictures and other items, as well as related methods for using such tools.

Thus, one embodiment of the invention is directed to an apparatus for facilitating the hanging of an object on a wall or other surface. The apparatus includes: a main body section having a first surface; an upper section connected to the main body section and having a protruding portion that protrudes away from the first surface; a lower section connected to the main body section and having an opening for accepting and holding a hanging/attachment element; and a securing mechanism. At least one of the upper section or the lower section is a slidable section that is slidably attached to the main body section and thereby capable of moving vertically up and down the main body section, but can be temporarily fixed (or secured) at an arbitrary position along the main body section using the securing mechanism.

A method of using the foregoing apparatus involves: (a) placing the hanging/attachment element within the opening; (b) supporting an item to be hung from the hanging/attachment element while the hanging/attachment element is disposed within the opening; (c) following step (b), sliding the upper section down the main body section until the protruding portion makes contact with the item, thereby identifying a vertical position for the upper section; (d) following step (c), temporarily fixing the upper section at the position using the securing mechanism; (e) following step (d), removing the item from the hanging/attachment element; (f) following step (e), placing the apparatus at a location on a desired surface, with the upper section at the identified vertical position, and with a bottom edge of the protruding portion designating where a top edge of the item will be; and (g) with the apparatus placed at the location on the desired surface, and with the hanging/attachment element disposed within the opening, attaching the hanging/attachment element to the desired surface.

By virtue of the foregoing arrangement, it can be possible to identify and preserve the distance between the top of a picture frame or other item to be hung while the item is in a position (e.g., at a height) at which it is relatively easy to manipulate. Then, the item can be removed from the apparatus, and the apparatus alone (without the weight and bulk of the item to be hung) can be placed against a wall and used to insert the hanging/attachment element (e.g., mounting hardware) at a position that is appropriate to the desired location of the item to be hung.

The preferred embodiments of the present invention accommodate different types and sizes of hanging/attachment elements, e.g., including just a nail or screw alone and/or a conventional picture-hanging hook (which typically is attached to a wall using a nail). In addition, the desired item (e.g., picture, other decorative item or clock) preferably is actually hung from the desired hanging/attachment element while such hanging/attachment element is within the tool, thereby accurately establishing the distance between the top of the item and the point(s) at which it will be hung under the actual hanging conditions (e.g., using the same hardware and with the full weight of the item applied). With this distance established and preserved, the tool typically can be used to accurately position the hanging/attachment element such that when the item is hung from it, the item will be at its desired location.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

Figure 1:
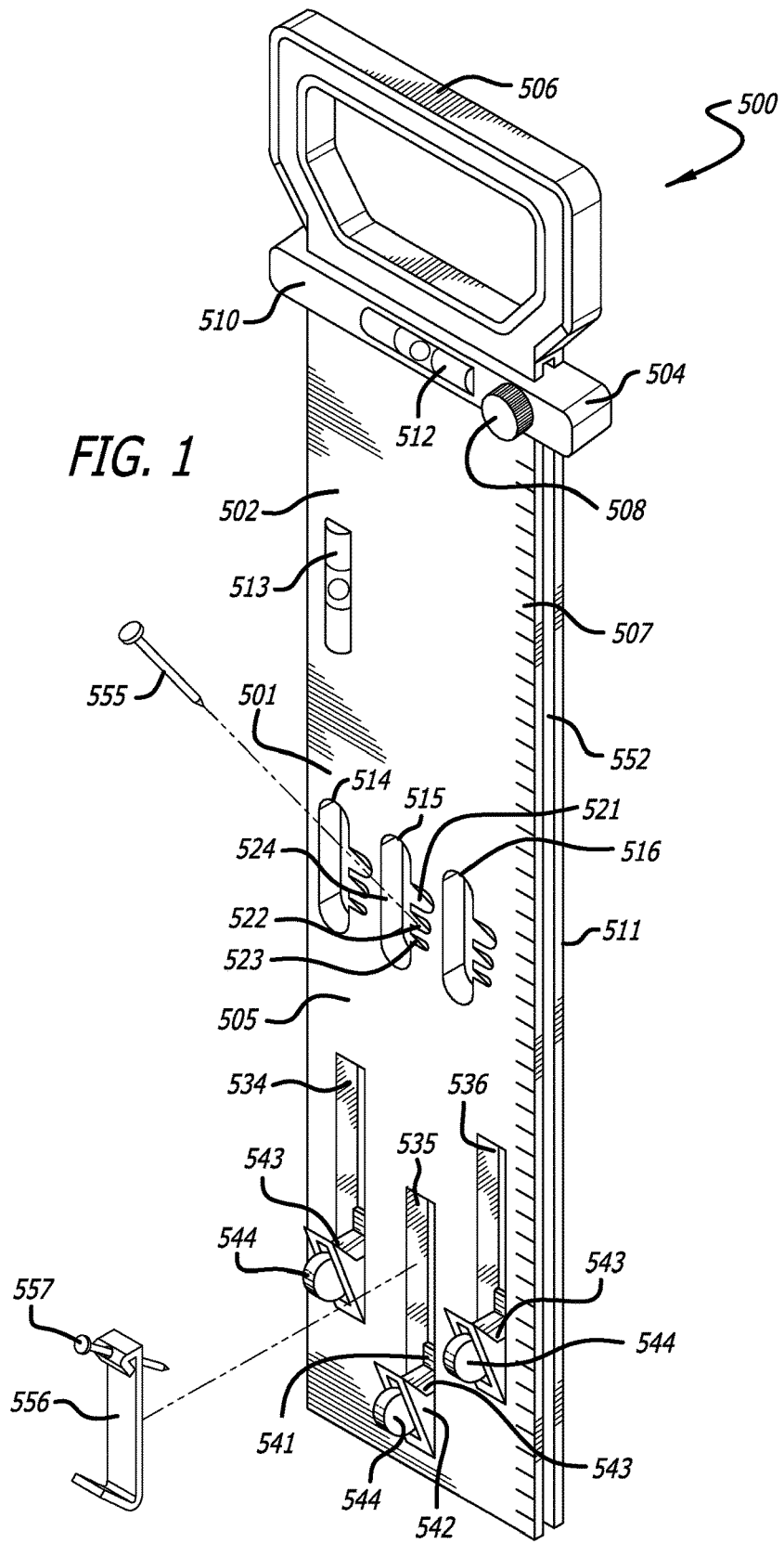
FIG. 1 is a perspective view of a tool according to a first representative embodiment of the present invention, with two different types of hanging/attachment elements (a plain nail and a picture-hanging hook) exploded out from it.
Figure 2:
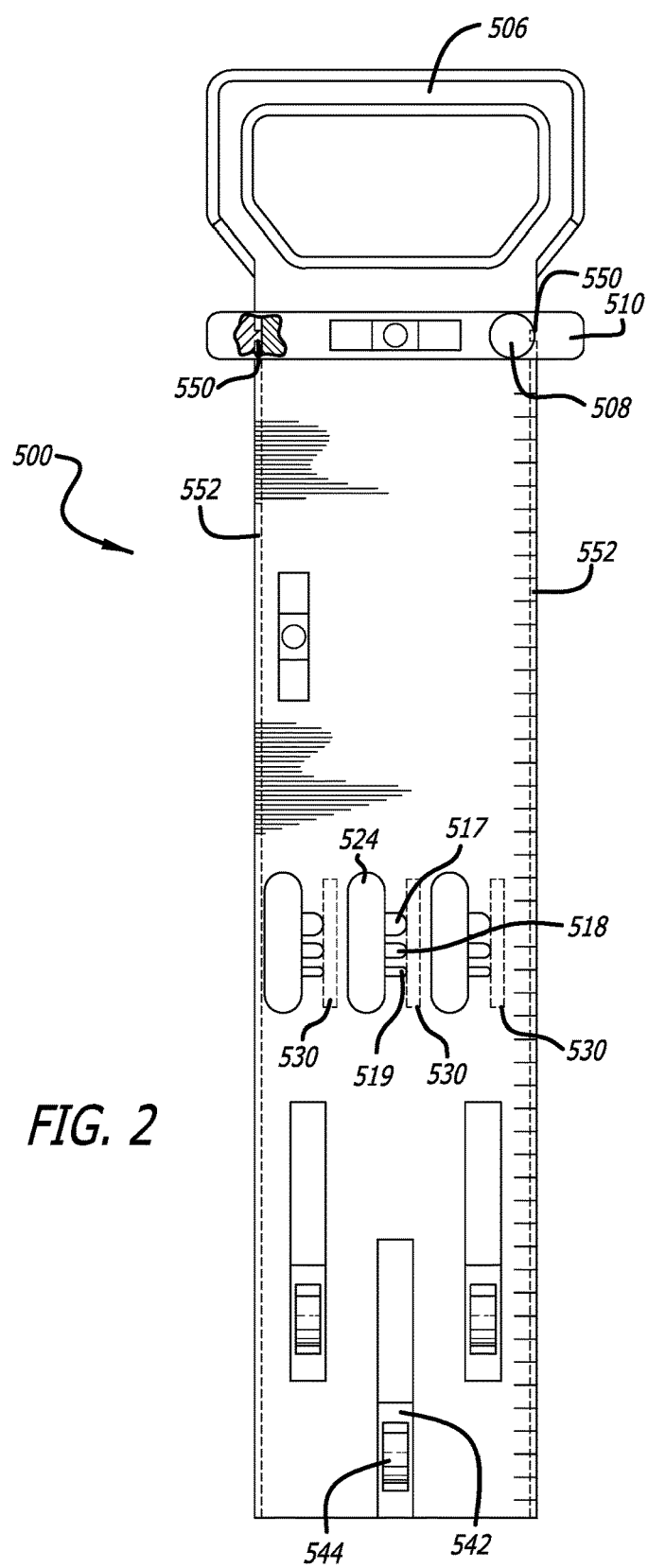
FIG. 2 is a front elevational view of the tool.

Certain tools for facilitating the hanging of a picture or other item were disclosed in the '761 application. Another exemplary tool 500 for a similar purpose is illustrated in FIGS. 1-6. As shown, tool 500 includes a main body section 502, which preferably is an elongated, substantially rectangular structure. Disposed closer to the top end of the main body section 502 is an upper section 504, and disposed closer to the bottom end of the main body section 502 is a lower section 505. In ordinary use, tool 500 is oriented as shown in FIGS. 1-6, with the main body section 502 being substantially vertical and with the upper section 504 disposed above the lower section 505. Preferably, a handle 506 is disposed above the upper section 504. Also, in the preferred embodiments length-measuring (or ruler) markings 507 are provided along the length of the tool 500 for the user's reference.

It is noted that the attached drawings frequently show different types of hanging/attachment elements (e.g., both a simple nail 555 and a picture-hanging hook 556) disposed within a tool according to the present invention (e.g., tool 500) at the same time. However, such depictions merely show the different ways in which the tool 500 can be used. Ordinarily, only one type of hanging/attachment element will be used at any given time.

Also, in the current embodiment, for reasons which will become apparent below, upper section 504 is slidably attached to the main body section 502 of the tool 500, while the lower section 505 is fixedly connected to (and more preferably, integrally formed with) the main body section 502. However, in alternate embodiments, upper section 504 is fixedly connected to the main body section 502, and lower section 505 is slidably attached to the main body section 502. In still further embodiments, both upper section 504 and lower section 505 are slidably attached to the main body section 502. In any event, the distance between upper section 504 and lower section 505 preferably can be varied by a user, and once a desirable distance has been identified the two sections 504 and 505 can be temporarily fixed relative to each other through the use of a securing mechanism (as discussed in more detail below). Although the upper section 504 is slidably attached to the main body section 502, and lower section 505 is fixedly connected to it in the current embodiment, no loss of generality is intended, and descriptions relating to the sliding of upper section 504 can apply to lower section 505 in those embodiments in which it (also or instead) is slidable. In certain embodiments, clearance is provided between the slidable section(s) and the main body section 502 so that such slidable section(s) can pass over any components that protrude forward of the front surface 501.

In the current embodiment, upper section 504 includes tabs 550 on each side that engage with slots 552 on the left and right edges of main body section 502 (e.g., in a tongue-and-groove manner), thereby allowing the upper section 504 to slide along main body section 502. However, in alternate embodiments, other sliding mechanisms (e.g., such as by providing one or more tabs on upper section 504 that engage with corresponding slot(s) on the front surface of main body section 502) are used. Preferably, however, any engagement between the upper section 504 and the main body section 502 is confined to the side edges and/or front surface of main body section 502, and the rear or back surface 511 of the entire tool 500 (i.e., including the combination of the rear surfaces of the main body section 502 and any fixedly attached sections) is completely flat (e.g., so that any slidable sections do not extend beyond this flat surface).

Also, depending, e.g., upon the type of securing mechanism used, it sometimes will be preferable to provide sufficient friction between the slidable section(s) and the main body section 502 so that they can only be slid relative to each other by applying manual force (e.g., gravity alone being insufficient). However, particularly for embodiments where both sliding and securing can be accomplished simultaneously with a user's single hand (e.g., as described below), in some cases such friction might be unnecessary and/or result in more of a burden than any benefit it would provide.

Each slidable section (only upper section 504 in the current embodiment) preferably includes (or at least has associated with it) a securing mechanism, allowing a user to slide it up and down the main body section 502 when desired and then temporarily secure (or lock) it into a desired position. For the current embodiment of tool 500, upper section 504 includes a set screw 508 for this purpose (which, although shown in a particular location in the drawings, can in fact be located anywhere on the upper section 504). Preferably, in order to avoid having to use a screwdriver, set screw 508 is provided with wings, tabs, or some other large structure at its head, so that a user can turn (i.e. tighten or loosen) the screw 508 with his or her fingers alone. When the securing mechanism comprises such a set screw 508, friction between the corresponding slidable section and the main body section 502, as described in the preceding paragraph, can be provided, if desired, in order to lessen the likelihood that the slidable section (i.e., upper section 504 in the current embodiment) will move inadvertently between the time that it is moved into the desired position and the time that set screw 508 can be adequately tightened to secure it into that position.

As indicated above, in the present embodiment upper section 504 slides vertically up and down along main body section 502 and includes a protruding portion 510 extending forward of the front surface 501 of main body section 502. In the preferred embodiments, such protruding portion 510 is elongated, substantially straight (or at least has a substantially straight bottom edge) and oriented horizontally when the tool 500 is used (i.e., substantially perpendicular to the vertical direction in which the upper section 504 slides relative to the main body section 502). In the current embodiment, the protruding portion 510 constitutes substantially all of upper section 504, so the two sometimes are referenced herein interchangeably; however, no loss of generality is intended. Once again, the rear surface 511 of tool 500 preferably is completely flat, thereby allowing it to make maximum contact with a wall 560 or similar surface. Still further, as shown, e.g., in FIG. 1, in the current embodiment upper section 504 (and, more specifically in the current embodiment, the protruding portion 510 of upper section 504) includes a level 512 (e.g., oriented horizontally for determining when protruding portion 510 is perpendicular to gravitational pull). However, level 512 instead could be provided on any other portion of tool 500. In addition, another level 513, perpendicular to level 512, preferably is provided on the main body section 502 (although it too instead could be provided on any other portion of tool 500). Also, although shown extending forward of the front surface 501 (e.g., in FIG. 1), in alternate embodiments level 513 is fully embedded within the tool 500 so as to lessen the need for the clearance (discussed above) between upper section 504 and the main body section 502.

As also indicated above, lower section 505 of tool 500 is integrally formed with the main body section 502. As shown, lower section 505 includes one or more openings (a total of 12 openings in the current embodiment), each for accommodating (e.g., accepting and holding) a hanging/attachment element, such as a simple conventional nail 555 or screw, or a conventional picture-hanging hook 556 (which typically is attached to a wall 560 with a nail 557). More specifically, in the current embodiment lower section 505 includes three sets 514-516 of openings. Each such set (set 515 being representative), in turn, includes three openings 517-519 through the lower section 505 of the tool 500. As shown, the sets 514-516 preferably are aligned horizontally and are uniformly spaced apart from each other, with the openings 517-519 of set 515 being centered on the tool 500 (preferably also centered on lower section 505). As shown, each of such openings 517-519 preferably also is disposed at the end of a corresponding horizontal slot 521-523, preferably having the same width as its respective opening 517-519. In this latter regard, each of the openings 517-519 preferably is sized differently, with opening 517 being the widest and with openings 518 and 519, respectively, being progressively narrower. As will be readily appreciated, openings 517-519 are configured for accepting and holding a nail, screw or similar simple hanging/attachment element. Because the openings 517-519 have different widths, each can be appropriate to a different-sized nail (or other hanging/attachment element), i.e., nails and/or screws having different shaft widths. In any event, in the present embodiment all of the horizontal slots 521-523 within a given set (again, set 515 being representative) terminate at their right ends in a wider vertically oriented opening (or slot) 524. As discussed in greater detail below, opening 524 preferably is wide enough to allow the head of any nail, screw or similar hanging/attachment element that is intended to be used to pass through it.

Figure 6:
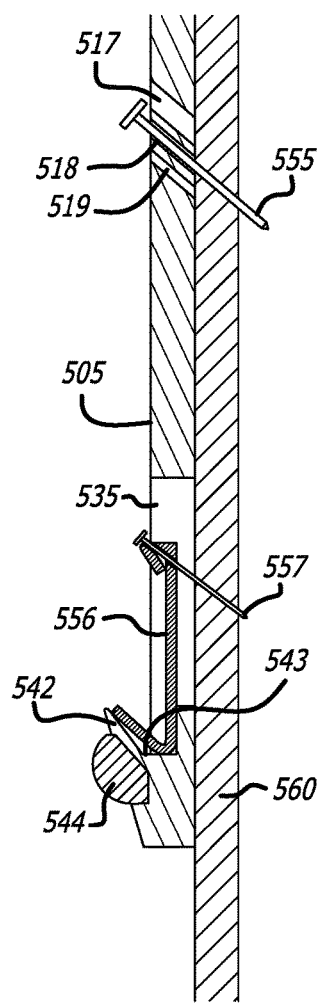
FIG. 6 is a side sectional view of the portion of the tool shown in FIG. 5.

As shown most clearly in FIG. 6, openings 517-519 preferably are angled downwardly (e.g., at approximately 45° relative to the front surface 501) through the depth of lower section 505, so that a nail 555 or screw will be inserted into the wall 560 (or other surface) at the same angle. However, in alternate embodiments, any other angle may be used, or such openings 517-519 might be made entirely horizontal in this dimension, e.g., depending upon user preference, the type of material of which the wall 560 is made, whether the hanging/attachment element is being inserted into a start or just drywall, etc. Also, in still further embodiments, multiple different slots for accommodating a nail or screw, each providing a different angle (e.g., both 45° and 90° relative to the front surface 501), are provided.

Figure 10A:
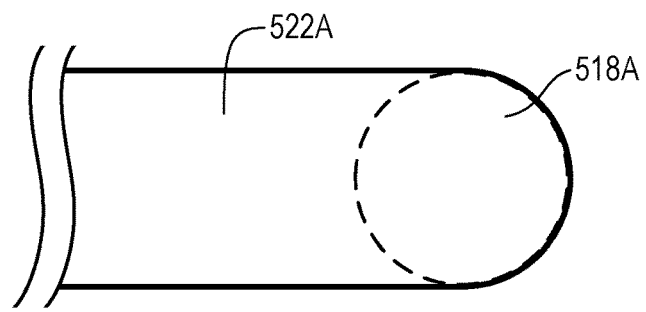
FIG. 10A is a front conceptual view of a first configuration of a nail/screw opening and adjacent portion of its corresponding slot.
Figure 10B:
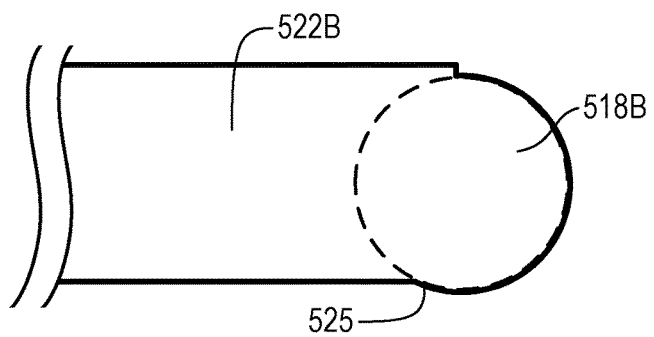
FIG. 10B is a front conceptual view of a second configuration of a nail/screw opening and adjacent portion of its corresponding slot.
Figure 10C:
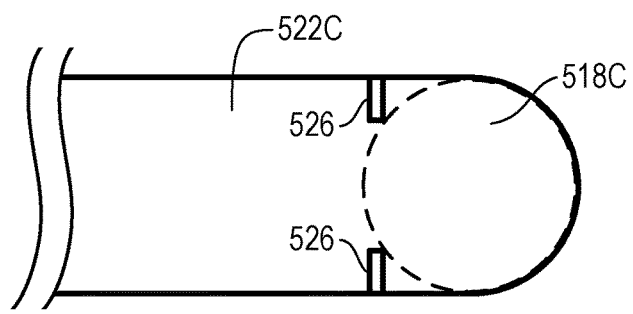
FIG. 10C is front conceptual view of a third configuration of a nail/screw opening and adjacent portion of its corresponding slot.

In the present embodiment, each of the openings 517-519 can be considered just the (e.g., circular) left end portion of its corresponding slot 521-523, i.e., with no specific demarcation between any given one of the openings 517-519 and its corresponding slot 521-523 (e.g., as shown more clearly with reference to opening 518A and slot 522A in FIG. 10A). However, in alternate embodiments, e.g., to help maintain the hanging/attachment element within its corresponding opening 517-519, each opening 517-519 is physically distinguishable from its corresponding slot 521-523, e.g., with each such opening 517-519 disposed slightly lower than its corresponding slot 521-523 (e.g., as shown with reference to opening 518B and slot 522B in FIG. 10B), essentially resulting in a notch 525, and/or with a small tab 526 extending inwardly from the top and/or bottom edge of the opening 518 (e.g., as shown with reference to opening 518C and slot 522C in FIG. 10C). The tab(s) 526 (when provided) can be integrally formed with the lower section 505 (e.g., molded as a single piece of plastic), or can be separate pieces that are inserted (e.g. snapped or screwed) into the surfaces from which they protrude. In addition, such tab(s) 526 (when provided) preferably are resilient, thereby allowing a screw, nail or similar hanging/attachment element to be snapped into the opening 518C.

Still further, referring again to FIG. 2, for similar reasons (e.g., to help maintain the hanging/attachment element within its corresponding opening 517-519), a magnet 530 preferably also (or instead) is provided adjacent to each opening 517-519 (in the present embodiment, embedded within the lower section 505 just to the left of each such opening 517-519, with a single elongated magnet 530 provided for each set 514-516 of openings).

Three additional openings 534-536 within lower section 505 are configured for accommodating (e.g., accepting and holding) conventional picture-hanging hooks. For this purpose, in the current embodiment, each of openings 534-536 is accompanied by (in reference to opening 535) a short backing section 541, an upwardly angled front section 542 and a bottom section 543, with the combination of these elements 541-543 providing a location to seat the picture-hanging hook 556. Because most such conventional picture-hanging hooks include a vertical backing section and, at its bottom, a hook that is angled, relative to the backing section, at approximately 45°, in the current embodiment upwardly angled bottom section 542 preferably also is angled at (or approximately at) 45°. Bottom section 543 preferably is long enough (e.g., 2-5 mm to accommodate the largest anticipated picture-hanging hook 556 and to provide adequate clearance from the front surface 501. Such an arrangement typically can allow the user to simply drop the picture-hanging hook into the bottom portion of any desired opening 534-536. However, in alternate embodiments, other structures and/or mechanisms can be used for holding a picture-hanging hook within the tool (e.g., clamping mechanism(s) to adjust the width of the openings 534-536 and/or to adjust the length of bottom section 543, etc.).

Similar to the nail-holding structures described above, a magnet 544 preferably is provided adjacent to each of the openings 534-536 to help hold the picture-hanging hook in place. In the present embodiment, a separate magnet 544

(such as a Velleman™ MAGNET8™ button-type or barrel-shaped rare-earth magnet) is provided below each such opening 534-536 (i.e., in the present embodiment, below the corresponding upwardly angled bottom section 542). However, in alternate embodiments a single (e.g., bar) magnet is adjacent to (and, therefore, retains hanging/attachment elements within) multiple or even all of such openings 534-536. Whatever type and/or quantity of magnet(s) 544 used, they typically will be hidden from view (contrary to the depiction in the present drawings). In addition to, or instead of, magnets, clips, clamping mechanisms and/or other structures or devices can be used to secure any or all of the hanging/attachment elements (e.g., simple nails 555 or screws, or picture-hanging hooks 556) accommodated by the tool 500. As discussed in greater detail below, the opening above the short backing section 541 (e.g., opening 535) preferably is sufficiently far above the top of the largest picture-hanging hook 556 that is expected to be used, to allow the tool 500 to be removed after the nail 557 (or similar hanging/attachment element) has been at least partially inserted into the wall 560 or other surface.

Unlike the nail-holding openings 517-519 discussed above, openings 534 and 536 preferably are aligned horizontally, but opening 535 is disposed lower to help prevent interference with the unused opening(s) when the pair of openings 534 and 536 are being used or when the single opening 535 is being used. In addition, opening 535 preferably is centered on the tool 500 and openings 534 and 536 are evenly spaced from opening 535, so that the center opening 535 can be used if just a single picture-hanging hook is to be used for hanging the desired item, or else the two outer openings 534 and 536 can be used if two hooks are to be used. Preferably, each of the openings 534-536 is large enough (e.g., at least 2-3 inches high and, more preferably, at least 2½ inches high and sufficiently wide) to accommodate the largest picture-hanging hook that is intended to be used with the tool 500. In the alternate embodiments (discussed above) in which the hook 556 is clamped into the desired opening 534-536, it might be possible to obtain more accurate positioning, e.g., if a hook much narrower than the largest accommodated is being used.

Figure 7:
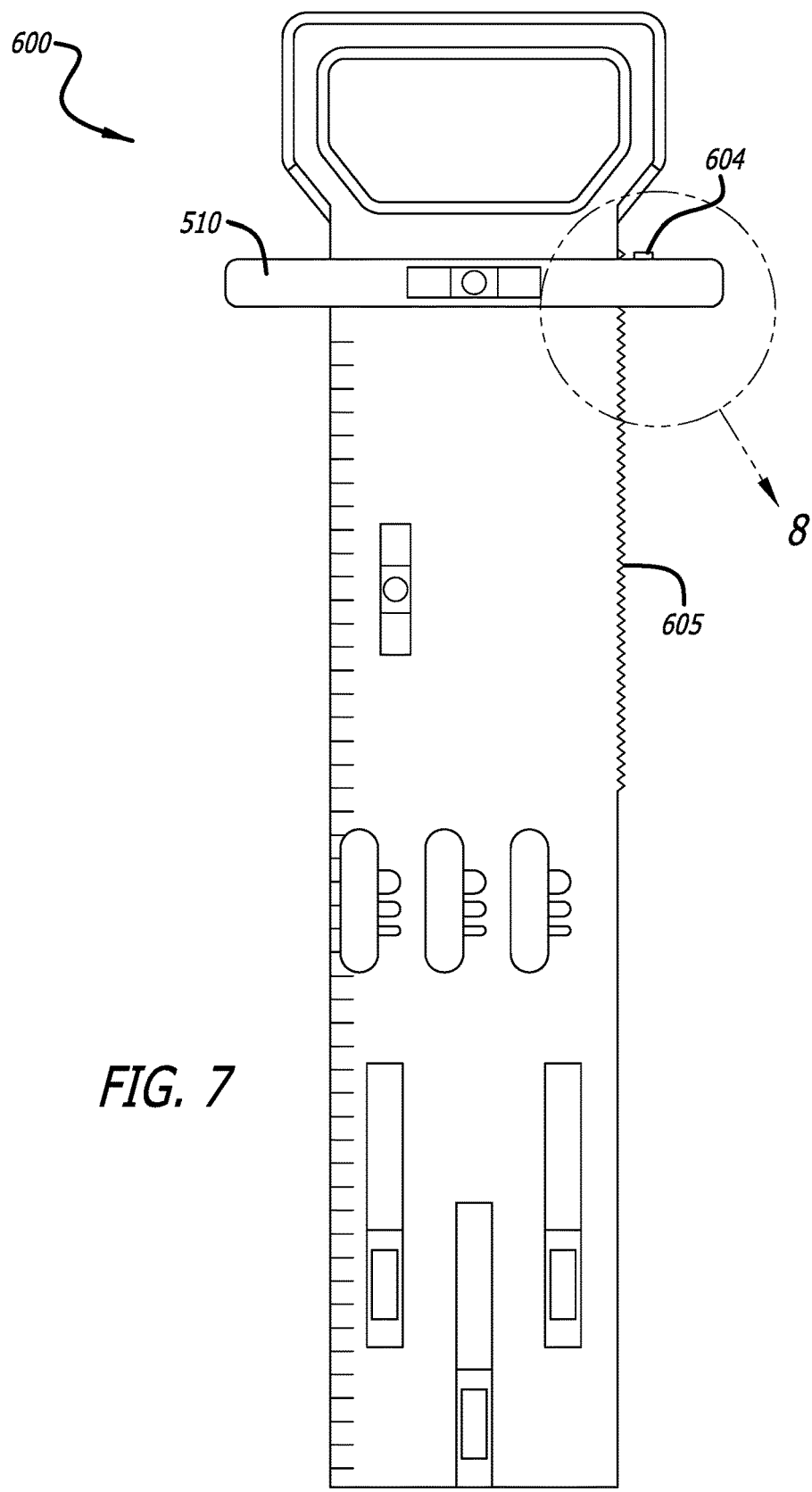
FIG. 7 is a front elevational view of the tool according to a second representative embodiment of the present invention.

In the embodiment described above, a set screw 508 is used as the securing mechanism for securing the upper section 504 at a desired position. However, other mechanisms are used in alternate embodiments. For example, the tool 600 shown in FIG. 7, uses a retractable (preferably spring-biased) engagement element 602 (shown in greater detail in FIGS. 8 and 9. In this alternate embodiment, engagement element 602 includes one or more components that engage with one or more vertically arranged sequences of slots, notches, teeth, etc., on one or more surfaces of the main body section 502 (in the current embodiment, on the edge of the main body section 502.

Figure 8:
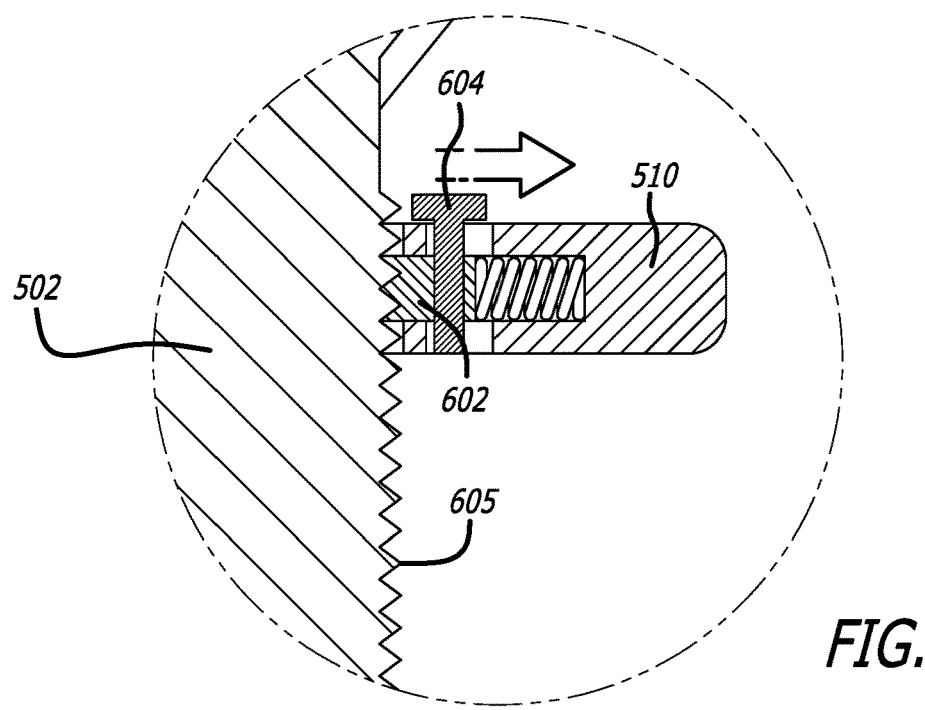
FIG. 8 is a side sectional view of a portion of the tool according to the second embodiment, showing the engagement element engaged with notches on a surface of the main body of the tool, thereby temporarily locking the upper section into position.
Figure 9:
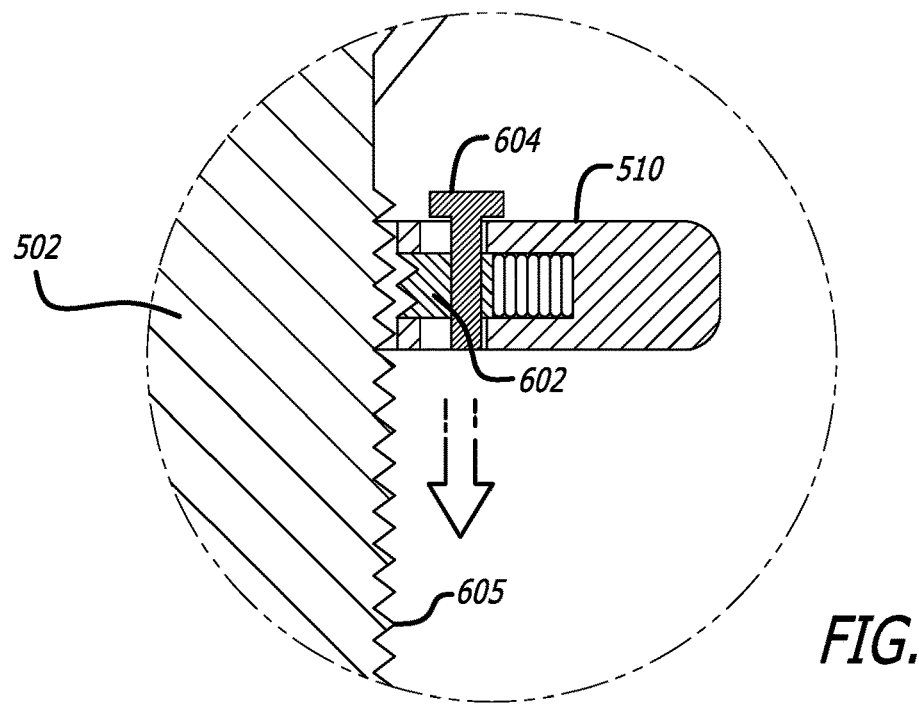
FIG. 9 is a side sectional view of a portion of the tool according to the second embodiment, showing the engagement element disengaged from the notches on the surface of the main body of the tool, thereby allowing the upper section to slide along the main body of the tool.

As indicated above, the engagement element 602 preferably is spring-biased against the surface of the main body section 502, i.e., so that its default position is to engage and thereby prevent sliding of the upper section 504. In such embodiments, a release actuator 604 preferably is provided to disengage engagement element 602. In the current embodiment, as shown in FIGS. 8 and 9, the release actuator 604 is implemented as a tab, fixedly attached to the engagement element 602, on the upper section 504. As a result, simply pressing release actuator 604 outwardly retracts (i.e., disengages) the engagement element 602, allowing upper section 504 to be slid, and then releasing release actuator 604 causes engagement element 602 to be re-engaged at that position, thereby inhibiting any further sliding. Typically, upper section 504 can be slid and release actuator 604 can be simultaneously operated with the use of a single hand.

In the current embodiment, the securing mechanism uses meshing elements (e.g., teeth, notches, slots, etc.), one or more on the engagement element 602 and a sequence of meshing elements 605 on the main body section 502. One benefit of this approach is that a more secure attachment often can be achieved. However, the cost of doing so is that the attachment can only be made at discrete positions along the length of the main body section 502. On the other hand, if the spacings between such slots or notches is made small enough, the importance of this drawback can be minimized. Nevertheless, in alternate embodiments, the engagement element 602 just makes frictional contact with the main body section 502 of tool 500, thereby allowing the upper section 504 to be secured at any desired location.

In another alternate embodiment, similar to that described above, the release actuator 604 is provided on the inner surface of a handle that extends from the protruding portion 510 (e.g., at or near the center of protruding portion 510, where the level 512 is located in the current embodiments) or from some other portion of upper section 504, and the engagement element 602 preferably engages with the front surface 501 of the main body section 502. As a result, upper section 504 can be slid and the engagement element 602 engaged and disengaged with the use of a single hand operating the handle. That is, squeezing the handle retracts the engagement element 602, allowing the handle to be used to slide the upper section 504 up and down. However, as soon as the user stops squeezing the handle, by default engagement element 602 re-engages with the main body section 502, thereby inhibiting any further sliding. In this alternate embodiment, the horizontal level 512 can be relocated to another position on the tool 500, so that it will not be obscured by the user's hand in ordinary use.

In a still further embodiment, the release actuator 604 is provided on handle 506. In such an embodiment, if the handle 506 is fixedly attached to the main body section 502, the engagement element 602 preferably is provided on the main body section 502, and it engages with a surface (e.g., flat or a sequence of notches) on the slidable upper section 504. More generally, it should be noted that the engagement element 602 and the release actuator 604 can be provided on either or both of the main body section 502 and the movable section (e.g., upper section 504). Also, although the engagement element 602 generally is discussed herein as continually tending toward engagement, in other embodiments a stop is included and may be activated by the user to allow the user to maintain the engagement element 602 in the disengaged state without continuous application of manual force.

In still further embodiments, engagement element 602 need not be spring-biased. However, in many of such further embodiments, engagement element 602 then essentially functions in a manner similar to a set screw, typically requiring some additional manual action to lock it into place. More generally, a securing mechanism used in the present invention can take any of a variety of different forms, e.g., button, screw or quick-release mechanism and can be located anywhere on the tool 500.

It is noted that each of the foregoing embodiments use horizontal slots (e.g., slots 521-523) between the nail or screw openings (e.g., openings 517-519) and the corresponding wider vertically oriented opening (e.g., opening 524). While such horizontal slots can sometimes help reduce the likelihood that the hanging/attachment element within a particular opening (e.g., any of openings 517-519) might accidentally slide into the wider vertically oriented opening 524, in alternate embodiments such horizontal slots are omitted, particularly in alternate embodiments in which adequate means are provided for securing the hanging/attachment element.

Also, in the foregoing embodiments separate sliding and securing mechanisms are provided in relation to the slidable section(s). However, in alternate embodiments a single structure is used to accomplish both functions. For instance, some of such alternate embodiments employ a slot-and-tab (e.g., tongue-and-groove) structure, such as described above in connection with slots 552 and tabs 550. However, unlike the previously described embodiment, in such alternate embodiments the tab on the upper section 504 is expandable (e.g., a threaded structure or a spring-biased or resilient structure) and retractable, so that it can be made to press against the inner walls of the slot (or mesh with structure on such inner walls) when desired to temporarily fix (or secure) the position of the upper section 504, and then made to retract (and thereby disengage or simply reduce friction with such inner walls) when it is desired to slide the upper section 504. As with the previously described embodiment, in such alternate embodiments the tab-and-slot combination can be located anywhere on the tool 500, e.g., on the side edges (as in the specific embodiment described above) and/or on the front surface 501.

Figure 11:
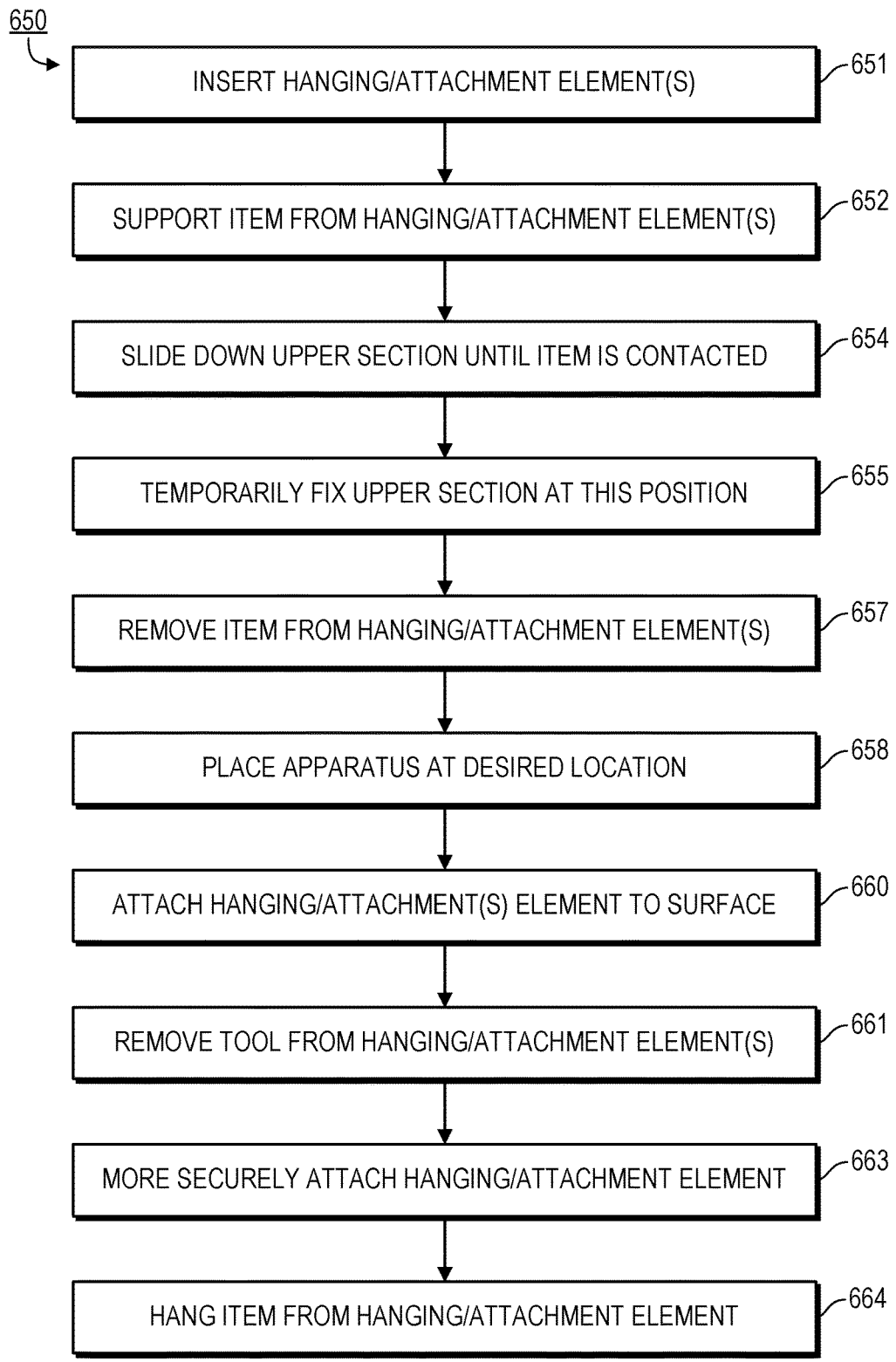
FIG. 11 is a flow diagram illustrating a process for hanging an item using a tool according to the present invention.

A method 650 for using a tool according to representative embodiments of the present invention (e.g., tool 500 or 600) is now discussed primarily in reference to FIG. 11, but also with additional references to certain of the other drawings. Although the following discussion generally refers to tool 500, such references are for convenience only and may be replaced with references to any other tool, e.g., according to the present invention.

Initially, in step 651 the hanging/attachment element(s) (usually just one a pair of the same type and size) are inserted into the tool 500. For instance, a nail 555 or screw might be inserted into the appropriate sized opening of 517-519 of the middle set 515 (when a single hanging/attachment element is to be used), or one might be inserted into each of the appropriate sized openings in each of the outer sets 514 and 516 (when two hanging/attachment elements are to be used). Preferably, in order to avoid unnecessary movement of such nail or screw, the smallest opening 517-519 that can accommodate such nail or screw is used. Alternatively, a picture hanging hook 556 might be inserted into the middle opening 535 (when a single hanging/attachment element is to be used), or one might be inserted into each of the outer openings 534 and 536 (when two hanging/attachment elements are to be used). In certain cases, the picture hanging hook 556 is tilted rearwardly to make contact with the short backing section 541. As noted above, in the preferred embodiments, a mechanism is provided (e.g., a magnet 530 or 544, a notch 525, one or more tabs 526 and/or a clip) for automatically helping to hold such hanging/attachment element(s) in place. In other embodiments, the user instead (or in addition) manually adjusts a mechanism (such as one or more clamps that adjust the size of the corresponding openings) to help secure the hanging/attachment element(s) in place.

Next, in step 652, the item to be hung (e.g., a framed picture, some other type of decorative item or a wall clock is supported from such hanging/attachment element(s) (inserted in step 651). Preferably, the hanging/attachment element(s) remain in the tool 500 (i.e., after having been inserted in step 651), and the item is hung from such hanging/attachment element(s) in the same manner that it would/will be when hanging on the wall 560. For this purpose, e.g., a hanging wire, notch or other structure on the item is engaged with the hanging/attachment element(s) and then the entire tool 500 is lifted by the handle 506 so that the full weight (or at least sufficient weight) of the item to be hung is applied to the hanging/attachment element(s) to simulate the situation that will occur when such item is hung on the wall 560 (or other desired surface), e.g., the hanging wire or string (if any) is pulled taut and any stretching of it occurs.

Figure 3:
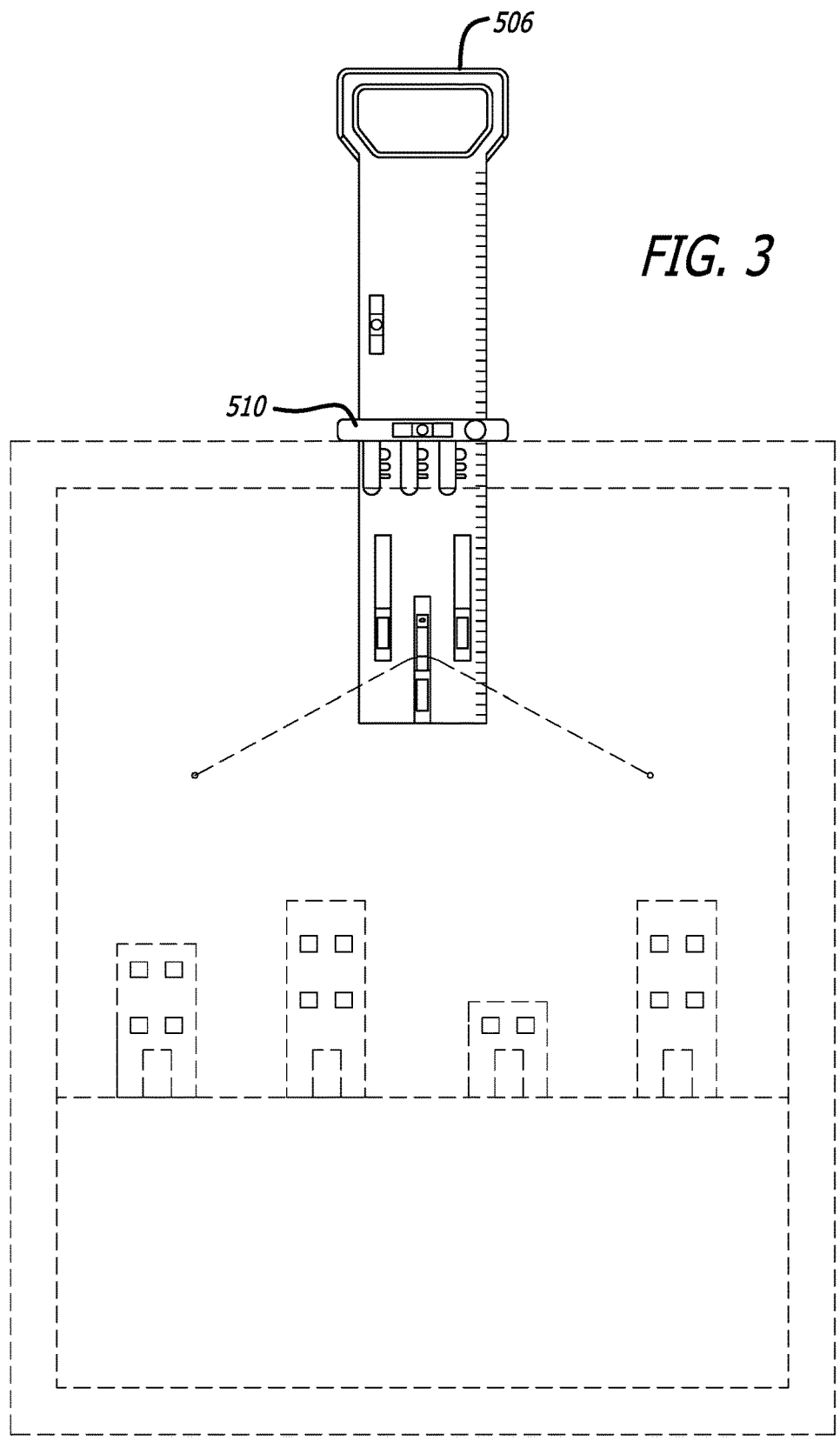
FIG. 3 is a front elevational view of the tool in use, immediately after having been adjusted to an item that is intended to be hung on a wall or other surface.

Next, in step 654, with the item to be hung preferably still supported by the hanging/attachment element(s), the upper section 504 is slid down until the bottom edge of protruding portion 510 makes contact with such item to be hung, e.g., with the results shown in FIG. 3. For this reason, in certain embodiments such bottom edge of protruding portion 510 is made of plastic, rubber or some similar material that is less likely to scratch or otherwise damage the item. Preferably, upper section 504 begins this process 650 at its very highest point. Prior to sliding upper section 504, any actions necessary to make it slidable (e.g., loosening of a set screw 508, or retracting or otherwise disengaging an engagement element 602) preferably are performed.

Next, in step 655, the upper section 504 is temporarily fixed (or secured) at the position identified in step 654, e.g., using a provided securing mechanism, such as by tightening set screw 508 or engaging engagement element 602. In certain embodiments, this step 655 is performed by the user's other hand (i.e., the one not holding handle 506). For example, for embodiments in which a set screw 508 is used, gravity typically will maintain upper section 504 (more specifically, the bottom edge of its protruding portion 510) in contact with the top of the item, so that the user's other hand can be used to tighten the set screw 508. In certain embodiments in which an engagement element 602 is used as the securing mechanism, the user's other hand, which has been used to slide the upper section 504 into position, simply releases pressure on the release actuator 604, thereby causing engagement element 602 to engage.

Next, in step 657 the item is removed from the hanging/attachment element(s). Typically, because the bottom edge of the protruding portion 510 is at this point in contact with the top edge of the item, it will not be possible to simply lift the item off of the tool 500, as one ordinarily would do. Also, because the item might be large and heavy, in many cases it will be preferable to remove the tool 500 from the item (e.g., with the item resting on another surface). Therefore, preferably, the top edge of the item is first tilted forward, relative to the tool 500, thereby allowing it to clear the bottom edge of the protruding portion 510, and then the item either is lifted off the hanging/attachment element(s) or, more preferably, the tool 500 is slid downwardly and then separated from the item. In any event, once the item has been removed, with the upper section 504 fixed into position as a result of step 655 and, typically (although not necessarily) with the hanging/attachment element(s) still in place within the tool 500, the bottom edge of the protruding portion 510 represents where the top edge of the item would be if the item were to be suspended from such hanging/attachment element(s) at their position(s) within the tool 500.

Accordingly, in step 658, the tool 500 is placed at the location at which the item is desired to be hung and, more specifically, such that the bottom edge of the protruding portion 510 is where the top edge of the item is desired to be. For this purpose, horizontal level 512 can be employed to help the user find an appropriate orientation (e.g., when the item has a straight top edge). It is noted that because the item is no longer suspended within the tool 500, unlike conventional tools, it often will be much easier to manipulate the tool 500 into different potential positions on the wall 560 (or other surface) in order to ultimately find the desired position for the item, and then to perform the other steps noted below.

Figure 4:
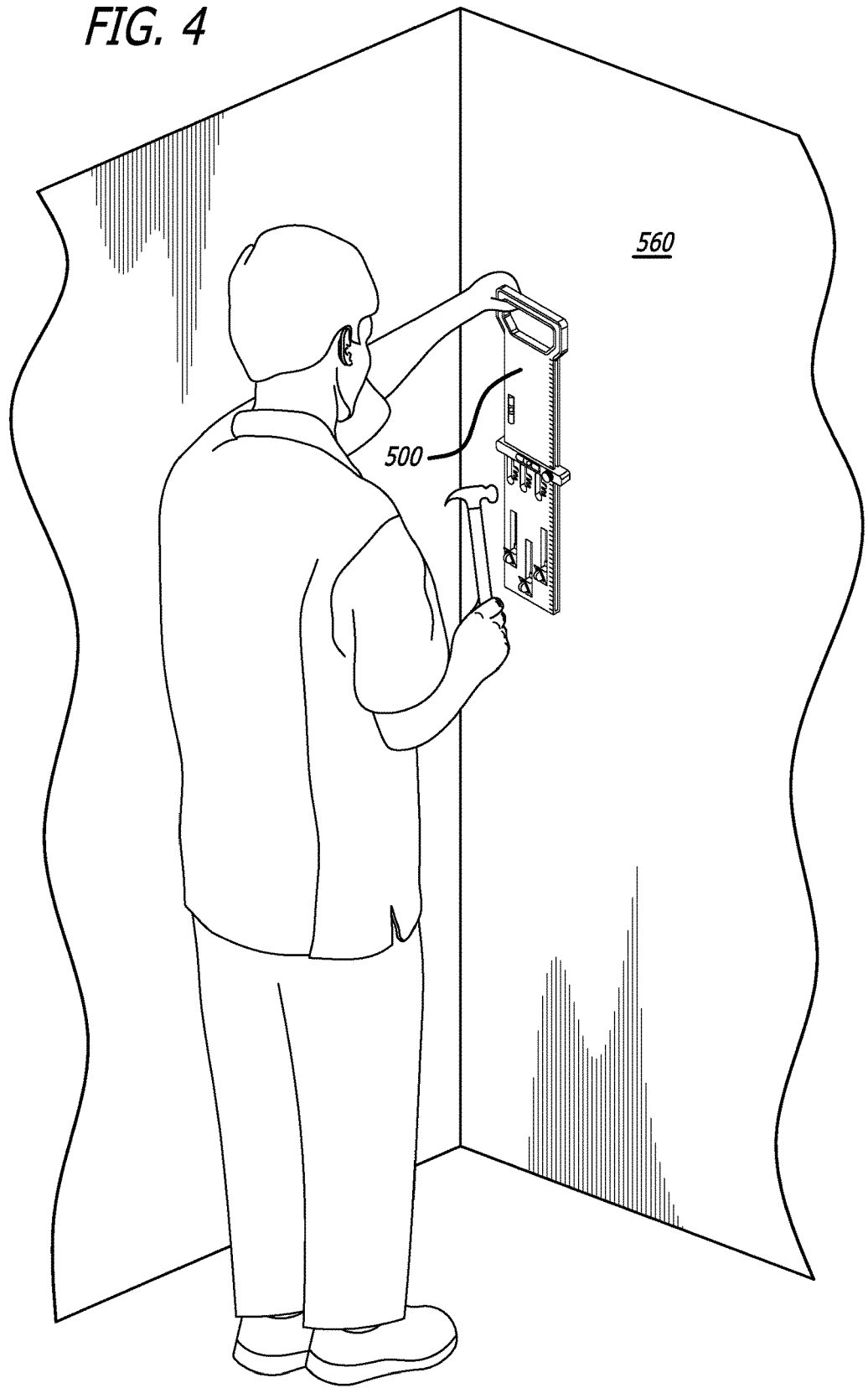
FIG. 4 is a perspective view of a user employing the tool to begin attaching a hanging/attachment element to a wall at a position appropriate to the desired location for the item to be hung.
Figure 5:
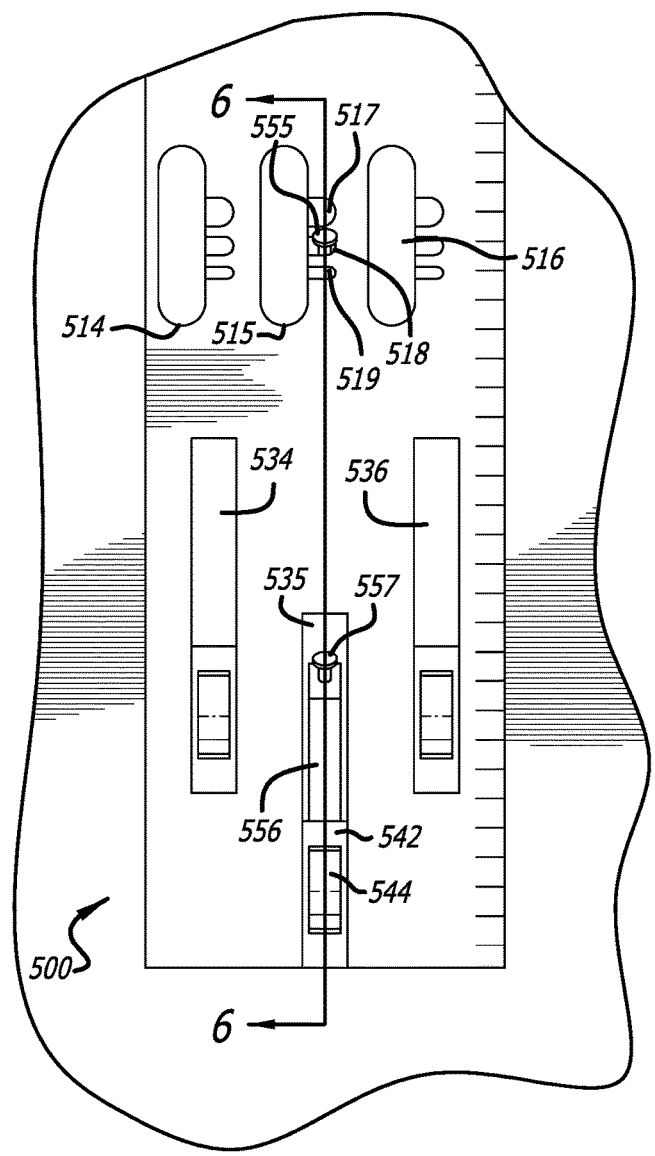
FIG. 5 is a front elevational view of a portion of the tool with the two different types of hanging/attachment elements (a plain nail and a picture-hanging hook) seated within it.

Next, in step 660, with the tool 500 positioned at the location identified in step 658, the hanging/attachment element(s) are attached to the surface. FIG. 4 shows a user holding a tool 500 at the desired location and about to begin pounding in one or more nails within the tool 500. As indicated above, such hanging/attachment element(s) often will already be disposed within the tool 500. If not, it/they are reinserted and then attached in this step 660. In some cases, the attachment in this step 660 will involve just starting a nail or screw into the wall 560 (or other surface), i.e., inserting it/them partially into such surface. In others, the nail or screw will be inserted all (or almost all) of the way into the wall 560 (e.g., using the thickness of the tool 500 to provide the desired amount of extension for a simple screw or a simple nail 555. If a screw is being used, it often will be desirable to first drill a hole to the surface, e.g., through the opening (such as one of openings 517-519) into which it is ultimately to be inserted or through the opening(s) in the picture hook 556 which is to be used.

Next, in step 661 the tool 500 is removed from the hanging/attachment element(s), which ordinarily is/are now at least partially inserted into the wall 560 (or other surface). For example, if one or more simple nails or screws is/are being used as the hanging/attachment element(s), the tool 500 is manipulated such that the shaft of the (or each) hanging/attachment element slides along its corresponding slot (e.g., one of slots 521-523) until the head of such nail or screw can pass through the vertically oriented opening 524, thereby allowing the tool 500 to be removed from such hanging/attachment element(s). On the other hand, if one or more picture-hanging hooks 556 had been used as the hanging/attachment element(s), it ordinarily will be desirable to tilt the top of the tool 500 forward and/or slide the tool 500 downwardly in order to allow the top edge of the corresponding opening (e.g., any of openings 534-536) to clear the top of the corresponding picture-hanging hook 556. In any event, once the bottom of the picture-hanging hook 556 clears the top edge of the backing section 541, the tool 500 typically can be simply pulled away from the hanging/attachment element(s).

If the hanging/attachment element(s) had only been started in step 660, then in step 663 it/they are more securely attached with the tool 500 removed. Typically, this will involve pounding a nail or screwing a screw further (e.g., the rest of the way) into the wall 560 or other surface.

Finally, in step 664, the item is hung from the hanging/attachment element(s). For this purpose, the item preferably is hung in the same manner that it was in step 652. Additionally, the user may rotate the tool 500 by 90° in order to use the main body section 502 as a straight edge and the level 513 to ensure that the item is not tilted.

It is noted that in the foregoing method 650, the item is removed from the tool 500 before identifying the desired position on the wall 560. However, in alternate methods the item remains on the tool 500 until the desired position is found, and only then is it removed (e.g., after marking a spot on the wall 560 to help the user relocate that position).
Additional Considerations.

Unless otherwise clearly stated herein, all relative directions (e.g., left, right, top, bottom, above, below) mentioned herein in relation to an article are from the perspective of the article itself and, therefore, are consistent across different views.

In the event of any conflict or inconsistency between the disclosure explicitly set forth herein or in the attached drawings, on the one hand, and any materials incorporated by reference herein, on the other, the present disclosure shall take precedence. In the event of any conflict or inconsistency between the disclosures of any applications or patents incorporated by reference herein, the disclosure having the most recent priority date shall take precedence.

Unless clearly indicated to the contrary, words such as "optimal", "optimize", "maximize", "minimize", "best", as well as similar words and other words and suffixes denoting comparison, in the above discussion are not used in their absolute sense. Instead, such terms ordinarily are intended to be understood in light of any other potential constraints, such as user-specified constraints and objectives, as well as cost and processing constraints.

In the above discussion, certain methods are explained by breaking them down into steps listed in a particular order. However, it should be noted that in each such case, except to the extent clearly indicated to the contrary or mandated by practical considerations (such as where the results from one step are necessary to perform another), the indicated order is not critical but, instead, that the described steps can be reordered and/or two or more of such steps can be performed concurrently.

References herein to a "criterion", "multiple criteria", "condition", "conditions" or similar words which are intended to trigger, limit, filter or otherwise affect processing steps, other actions, the subjects of processing steps or actions, or any other activity or data, are intended to mean "one or more", irrespective of whether the singular or the plural form has been used. For instance, any criterion or condition can include any combination (e.g., Boolean combination) of actions, events and/or occurrences (i.e., a multipart criterion or condition).

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

In the discussions above, the words "include", "includes", "including", and all other forms of the word should not be understood as limiting, but rather any specific items following such words should be understood as being merely exemplary.

Several different embodiments of the present invention are described above and in the documents incorporated by reference herein, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention are to be considered as within the scope thereof as limited solely by the claims appended hereto.

What is claimed is:

1. An apparatus for facilitating the hanging of an object on a wall or other surface, said apparatus comprising:
   a main body section having a first surface;
   an upper section connected to the main body section and having a protruding portion that protrudes away from the first surface;
   a lower section connected to the main body section and having an opening for accepting and holding a hanging/attachment element; and
   a securing mechanism,
   wherein at least one of the upper section or the lower section is a slidable section that is slidably attached to the main body section and thereby capable of moving vertically up and down said main body section, but can be temporarily fixed at an arbitrary position along the main body section using said securing mechanism, and
   wherein said opening comprises (a) a first opening that is elongated and vertically oriented and (b) a second opening that is narrower than the first opening and formed within a side edge of the first opening, with the second opening having a width to accommodate a shaft of at least one of a nail or a screw, and with the first opening being wider than a head of said nail or screw.

2. An apparatus according to claim 1, further comprising a magnet disposed adjacent the second opening.

3. An apparatus according to claim 1, wherein the lower section includes a plurality of openings to accommodate a plurality of hanging/attachment elements.

4. An apparatus according to claim 3, wherein said openings have different shapes to accommodate different types of said hanging/attachment elements.

5. An apparatus according to claim 3, wherein said openings include at least two openings that are aligned horizontally, relative to a vertical motion of said slidable section.

6. An apparatus according to claim 3, wherein said openings include a set of said openings having a same general shape but different sizes to accommodate a plurality of said hanging/attachment elements having a same general configuration but different sizes.

7. An apparatus according to claim 1, wherein the protruding portion of the upper section has a substantially straight bottom edge that is oriented substantially perpendicular to a vertical direction in which said slidable section slides relative to the main body section.

8. An apparatus according to claim 1, wherein the upper section is said slidable section.

9. An apparatus according to claim 1, wherein the main body section includes markings to indicate distance.

10. An apparatus according to claim 1, wherein the securing mechanism comprises a set screw.

11. An apparatus according to claim 1, wherein the securing mechanism:
   (a) is included within said slidable section; and (b) includes an engagement element that is biased toward the main body section for temporarily fixing said slidable section at said arbitrary position along the main body section, but also can be manually retracted for permitting said slidable section to slide.

12. An apparatus according to claim 11, wherein the engagement element engages with any of a sequence of indentations within the main body section.

13. An apparatus according to claim 11, wherein a release actuator for the securing mechanism is provided on a handle that extends from the protruding portion and an engagement element for the securing mechanism engages with a front surface of the main body section.

14. An apparatus according to claim 1, further comprising a level for identifying a line perpendicular to gravitational pull.

15. An apparatus according to claim 1, further comprising a handle, disposed above the upper section and fixedly connected to the main body section.

16. A method of installing mounting hardware for hanging an item using the apparatus of claim 1, comprising:
   (a) placing the hanging/attachment element within the opening;
   (b) supporting an item to be hung from the hanging/attachment element while said hanging/attachment element is disposed within the opening;
   (c) following step (b), sliding the upper section down the main body section until the protruding portion makes contact with the item, thereby identifying a vertical position for said upper section;
   (d) following step (c), temporarily fixing the upper section at said position using the securing mechanism;
   (e) following step (d), removing the item from the hanging/attachment element;
   (f) following step (e), placing said apparatus at a location on a desired surface, with said upper section at the identified vertical position, and with a bottom edge of said protruding portion designating where a top edge of said item will be; and
   (g) with said apparatus placed at said location on said desired surface, and with the hanging/attachment element disposed within the opening, attaching the hanging/attachment element to said desired surface.

17. A method according to claim 16, further comprising steps, following step (g), of:
   (h) removing said apparatus from the hanging/attachment element; and then
   (i) more securely attaching the hanging/attachment element to said desired surface.

18. An apparatus according to claim 1, further comprising at least one of a magnet, a notch or a resilient tab for maintaining said nail within said second opening.

19. An apparatus according to claim 1, wherein the second opening is slightly wider than the shaft of said nail or screw.

20. An apparatus according to claim 1, wherein there exists sufficient friction between the slidable section and the main body section so that they can only be slid relative to each other by applying manual force, gravity alone being insufficient.

21. An apparatus according to claim 1, wherein a release actuator for the securing mechanism is provided on a handle that extends from and is fixedly attached to the main body section.

22. An apparatus according to claim 1, wherein said second opening is angled downwardly from a front surface to a rear surface of said lower section.

23. An apparatus according to claim 1, further comprising a third opening formed within said side edge of the first opening, having a width to accommodate at least one of a nail or a screw that has a wider shaft.

24. An apparatus according to claim 1, wherein said second opening is disposed at a distal end of a channel, said channel having a proximal end that extends from said first opening.

25. An apparatus for facilitating the hanging of an object on a wall or other surface, said apparatus comprising:
- a main body section having a first surface;
- an upper section connected to the main body section and having a protruding portion that protrudes away from the first surface;
- a lower section connected to the main body section and having (a) a first opening that is configured to accept and hold a nail and (b) a second opening that is configured to accept and hold the nail at a different angle than the first opening; and
- a securing mechanism,
- wherein at least one of the upper section or the lower section is a slidable section that is slidably attached to the main body section and thereby capable of moving vertically up and down said main body section, but can be temporarily fixed at an arbitrary position along the main body section using said securing mechanism.

\* \* \* \* \*